United States Patent
Chung

(10) Patent No.: US 7,062,863 B2
(45) Date of Patent: Jun. 20, 2006

(54) WASHING MACHINE AND METHOD OF CONTROLLING DRYING PROCESS THEREOF

(75) Inventor: Young-Suk Chung, Pusan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/769,800

(22) Filed: Feb. 3, 2004

(65) Prior Publication Data
US 2004/0216327 A1 Nov. 4, 2004

(30) Foreign Application Priority Data
Apr. 30, 2003 (KR) .................. 10-2003-0027749

(51) Int. Cl.
*F26B 11/02* (2006.01)
(52) U.S. Cl. .................. 34/596; 34/600; 34/606; 134/40; 134/42
(58) Field of Classification Search .................. 34/485, 34/486, 491, 495, 596, 600, 606; 134/40, 134/42
See application file for complete search history.

(56) References Cited

U.S. PATENT DOCUMENTS 4,250,628 A * 2/1981 Smith et al. .................. 34/260
5,228,212 A * 7/1993 Turetta et al. ................. 34/493
5,806,204 A * 9/1998 Hoffman et al. ............... 34/92
5,887,456 A * 3/1999 Tanigawa et al. .............. 68/20
6,161,306 A * 12/2000 Clodic .......................... 34/321

FOREIGN PATENT DOCUMENTS

GB      2 236 334      *  4/1991
WO      WO 98/33427    *  8/1998

OTHER PUBLICATIONS

Patent Abstracts of Japan for Publication No. 2001-300195, dated Oct. 30, 2001.

* cited by examiner

*Primary Examiner*—S. Gravini
(74) *Attorney, Agent, or Firm*—Staas & Halsey LLP

(57) ABSTRACT

A washing machine and method of controlling a drying process thereof is provided. The washing machine includes a water temperature detecting unit and a controller. The water temperature detecting unit is disposed in a condensing duct to detect temperatures of condensed water. The controller determines whether an end of a drying process is reached based upon the water temperatures detected by the water temperature detecting unit, and terminates the drying process depending on a result of the determination. Accordingly, the drying process may be terminated without delay, irrespective of various factors, such as a weight of the laundry, moisture contained in the laundry, and the temperature of cold water supplied to an inside of the condensing duct, so that a drying performance is improved, excessive drying and damage to the laundry are prevented and energy is saved.

24 Claims, 12 Drawing Sheets

$\sum \Delta T = \Delta T_1 + \Delta T_2 + \Delta T_3 + \Delta T_4 + \Delta T_5 + \Delta T_6 \cdots$ $\Delta T_1 = T_{a+5} - T_a$ $\Delta T_2 = T_{a+6} - T_{a+1}$ $\Delta T_3 = T_{a+7} - T_{a+2}$ $\Delta T_4 = T_{a+8} - T_{a+3}$

| SET NUMBER OF DETECTIONS | ACCUMULATIVELY COUNTED DRYING TIME (Tdb) |
|---|---|
| A1 | 0 ~ 10 |
| A2 | 11 ~ 20 |
| A3 | 21 ~ 30 |
| A4 | 31 ~ 40 |
| A5 | 41 ~ 50 |
| A6 | 51 ~ 60 |
| ⋮ | ⋮ |

WASHING MACHINE AND METHOD OF CONTROLLING DRYING PROCESS THEREOF

CROSS-REFERENCE TO RELATED APPLICATION

This application claims the benefit of Korean Application No. 2003-27749, filed Apr. 30, 2003, in the Korean Intellectual Property Office, the disclosure of which is incorporated herein by reference.

BACKGROUND OF THE INVENTION

1. Field of the Invention

The present invention relates, in general, to a washing machine equipped with a drying device to dry laundry and a method of controlling a drying process thereof.

2. Description of the Related Art

A washing machine equipped with a drying device is an apparatus that blows heated air into a space containing laundry to dry the laundry, and is designed to independently perform a drying operation, or to perform the drying operation in conjunction with general washing operations of the washing machine, that is, after a spin-drying process is complete.

Generally, the drying device is applied to drum-type washing machines.

When a drying process starts during an operation of the drum-type washing machine, a centrifugal fan operates and a drying heater turns on, so that hot air generated by the drying heater blows into a rotating tub of the drum-type washing machine. The laundry dries by repeating a process in which the laundry contained in the rotating tub rotates together with the rotating tub and then falls down to a bottom of the rotating tub. The hot air blown into the rotating tub is drawn to the centrifugal fan along a wall of a water tub, with moisture contained in the laundry being absorbed into the hot air. Thereafter, moisture, which is contained in the air circulated in the rotating tub and then drawn to the centrifugal fan, condenses on the wall of the water tub under an influence of a small amount of cold water that is supplied from a condensation hose connecting with an external water source to the wall of the water tub, and then the condensed moisture flows down to a bottom of the water tub. A small amount of condensed water collecting on the bottom of the water tub discharges from the washing machine through an outlet.

In a conventional method of controlling a drying process of the drum-type washing machine, a user may set a drying time for the laundry in consideration of a weight of the laundry. However, setting the drying time by the weight of the laundry is inaccurate and creates errors in the drying time setting. Further, since the moisture contained in laundry should be taken into consideration, even though the weight of a first laundry is a same as that of a second laundry, an amount of moisture in the first laundry may differ from that of the second laundry, thus, to accurately set the drying time is difficult.

In consideration of the above-described point, a method of controlling a dry process, in which a temperature of air blown into a rotating tub is detected and the drying process is terminated when the temperature of the air reaches a set temperature, is employed. However, although the method makes use of the temperature of the blown air, the drying time varies according to a weight of the laundry, moisture contained in the laundry and a temperature of the cold water supplied from an external water source, so that to accurately set the drying time is still difficult.

If the drying time for which the drying process is performed is to short, the drying process may be terminated before the laundry is completely dried, so that a drying performance may be lowered. In contrast, if the drying time is set to long, the laundry is excessively dried, so that the laundry rotated in the rotating tub may be damaged and, additionally, energy is wasted.

SUMMARY OF THE INVENTION

Accordingly, it is an aspect of the present invention to provide a washing machine and a method of controlling a drying process thereof, in which the drying process is performed based upon temperatures of condensed water, thereby preventing excessive drying of laundry.

Additional aspects and/or advantages of the invention will be set forth in part in the description which follows and, in part, will be obvious from the description, or may be learned by practice of the invention.

The above and/or other aspects are achieved by providing a washing machine to dry laundry contained in a rotating tub by circulating air heated by a drying heater, including a condensing duct to guide the circulated air having passed through the rotating tub to be drawn to the drying heater, a cold water supply unit to supply cold water to an inside of the condensing duct, a water temperature detecting unit to detect temperatures of water condensed through contact between the circulated air and the cold water, and a controller to determine whether an end of a drying process is reached based upon the temperatures of the condensed water detected by the water temperature detecting unit, and to terminate the drying process according to a result of the determination.

The water temperature detecting unit is positioned in a lower portion of the condensing duct so that the water temperature detecting unit is submerged in the condensed water.

The washing machine includes an air outlet disposed in the lower portion of the condensing duct to pass the circulated air therethrough, and the water temperature detecting unit is disposed between the air outlet and a bottom of the condensing duct.

The cold water supply unit includes a spray nozzle disposed in the condensing duct, a cold water supply hose connected to the spray nozzle, and a drying valve disposed in the cold water supply hose to selectively supply or cut off the cold water supplied from an external water source.

The washing machine further includes a counter to accumulatively count a drying time while the drying process is performed, and the controller is fed with the accumulatively counted time from the counter to determine whether the end of the drying process is reached.

The above and/or other aspects are achieved by providing a washing machine to dry laundry contained in a rotating tub by circulating air heated by a drying heater, including a water temperature detecting unit to detect temperatures of water condensed through contact between the circulated air and cold water supplied from an external water source to dry the laundry, a counter to accumulatively count a drying time while a drying process is performed, and a controller to determine whether an end of the drying process is reached based upon the water temperatures detected by the water temperature detecting unit and the drying time accumulatively counted by the counter, and to terminate the drying process according to a result of the determination.

The controller determines whether the end of the drying process is reached when the water temperature detected by the water temperature detecting unit decreases.

The controller determines whether the end of the drying process is reached by detecting the water temperatures at regular drying time intervals using the water temperature detecting unit, and comparing an accumulated temperature difference, which is calculated by accumulating temperature differences obtained in set sections, with a set value.

The controller determines whether the end of the drying process is reached by increasing a number of detections if the accumulated temperature difference satisfy the set value, and comparing the increased number of detections with a set number of detections corresponding to an accumulatively counted drying time.

The above and/or other aspects are achieved by providing a method of controlling a drying process of a washing machine to dry laundry contained in a rotating tub by circulating air heated by a drying heater, including detecting temperatures of water condensed through contact between the circulated air and cold water supplied from an external water source to dry the laundry, and terminating a drying process if an end of the drying process is reached is determined based upon the detected water temperatures.

Whether the end of the drying process is reached is determined by accumulatively counting a drying time while the drying process is performed, and taking the accumulatively counted drying time into account.

Whether the end of the drying process is reached is determined when the detected water temperature decreases.

Whether the end of the drying process is reached is determined by detecting the water temperatures at regular drying time intervals, calculating an accumulated temperature difference by accumulating temperature differences obtained in set sections, and comparing the accumulated temperature difference with a set value.

Whether the end of the drying process is reached is determined by increasing a number of detections and comparing the increased number of detections with a set number of detections corresponding to the accumulatively counted drying time.

BRIEF DESCRIPTION OF THE DRAWINGS

These and/or other aspects and advantages of the invention will become apparent and more readily appreciated from the following description of the preferred embodiments, taken in conjunction with the accompanying drawings of which:

FIG. 8B is a view illustrating set numbers of detections that are set to correspond to accumulatively counted drying times, according to a third embodiment of the present invention.

DETAILED DESCRIPTION OF THE PREFERRED EMBODIMENTS

Figure 1:
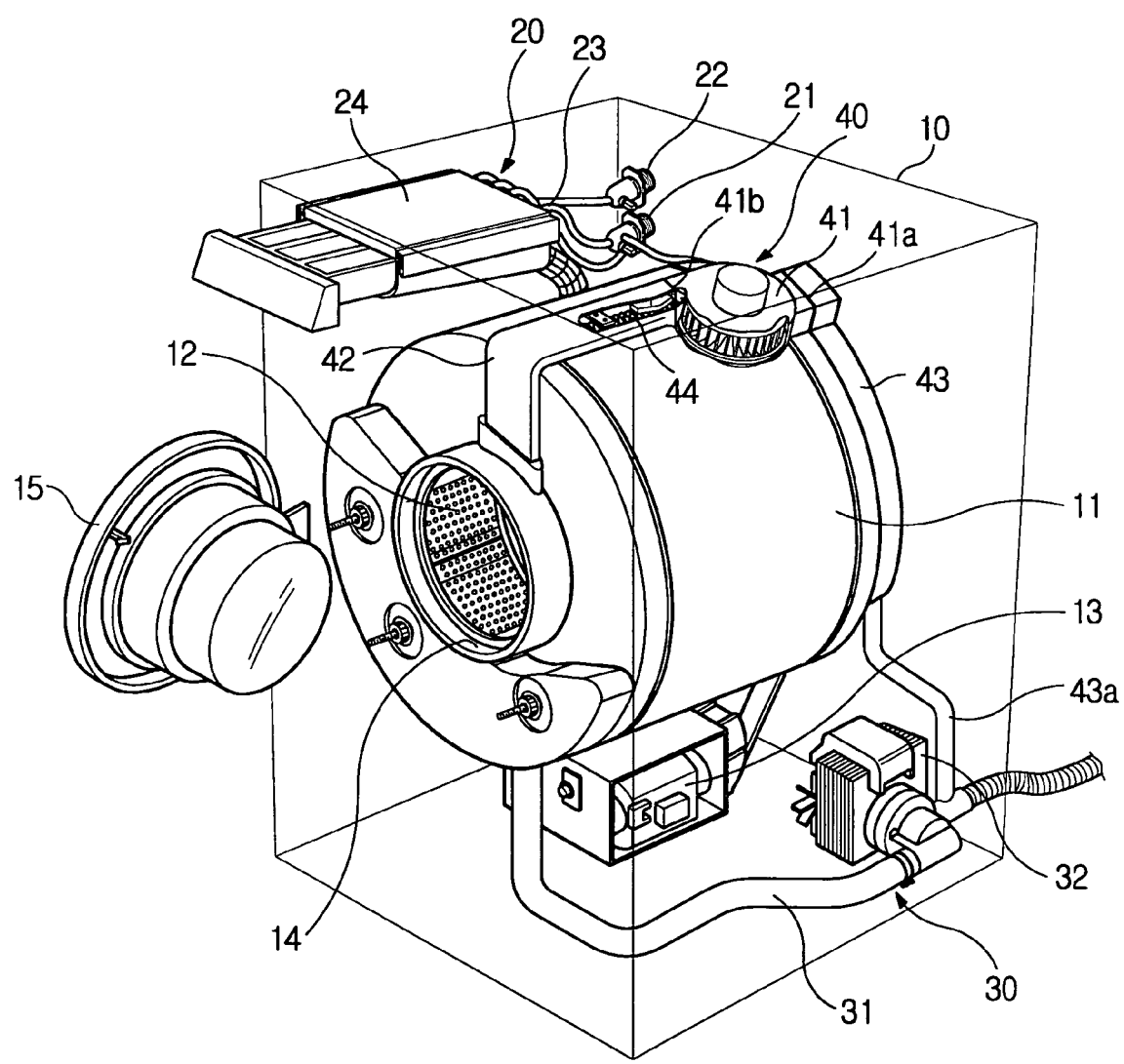
FIG. 1 is a perspective view of a washing machine, according to a first embodiment of the present invention.

Reference will now be made in detail to the embodiments of the present invention, examples of which are illustrated in the accompanying drawings, wherein like reference numerals refer to like elements throughout. The embodiments are described below to explain the present invention by referring to the figures.

Figure 2:
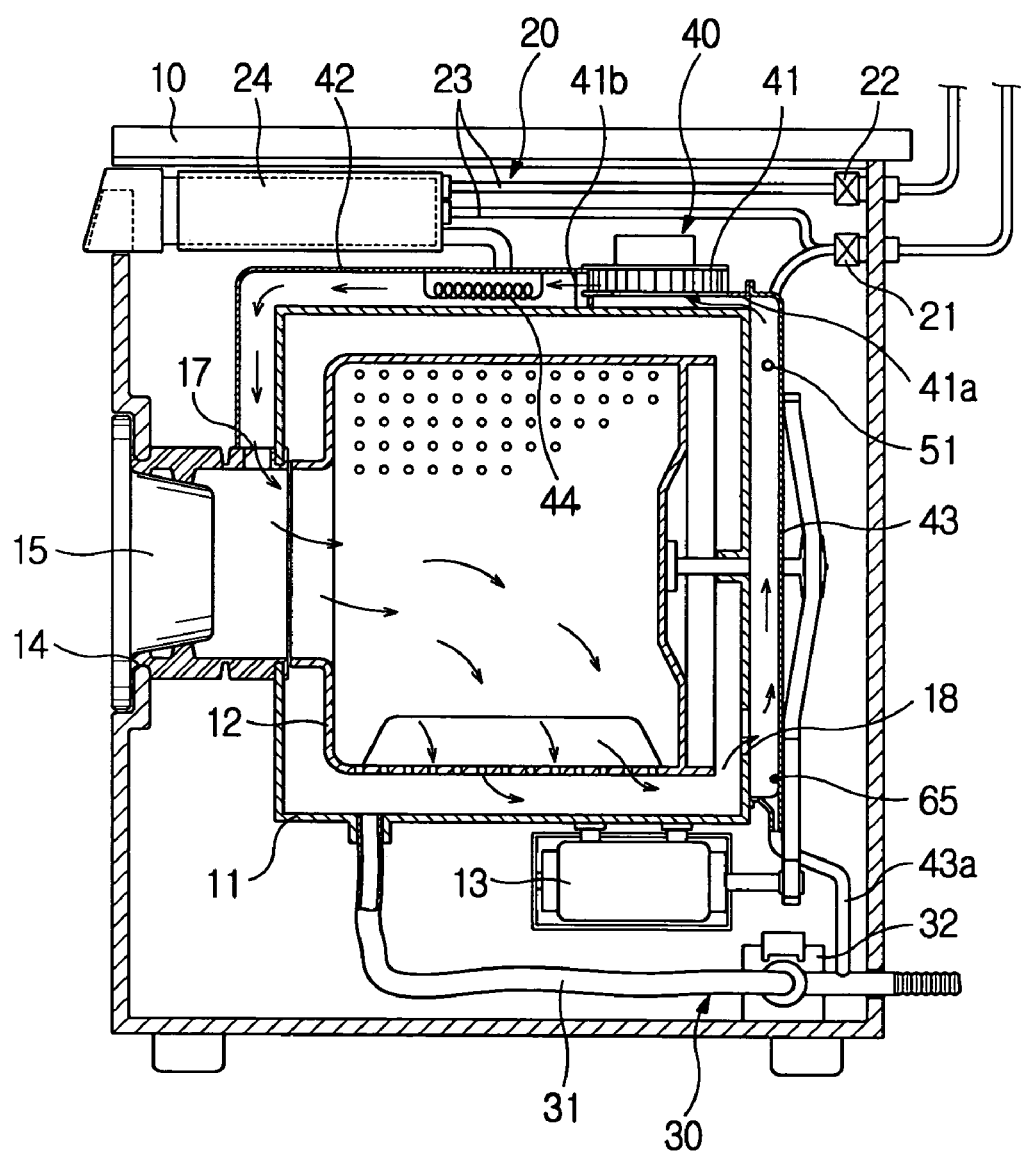
FIG. 2 is a sectional view of the washing machine of FIG. 1.

As shown in FIGS. 1 and 2, a washing machine of a first embodiment of the present invention includes a cylindrically shaped water tub 11 positioned in a cabinet 10 to contain washing water, and a cylindrically shaped rotating tub 12 disposed to rotate in the cylindrically shaped water tub 11 and provided with a number of perforations formed on a surface thereof. A drive motor 13 is positioned below the cylindrically shaped water tub 11 to perform washing, rinsing and spin-drying processes by rotating the cylindrically shaped rotating tub 12 disposed in the cylindrically shaped water tub 11 in forward and reverse directions. Further, an opening 14 is formed in fronts of both the cylindrically shaped water tub 11 and the cylindrically shaped rotating tub 12 so that a user draws laundry out in a front of the cabinet 10. A door 15 is installed in the front of the cabinet 10 to selectively open and close the opening 14 of the cylindrically shaped water tub 11.

A water supply unit 20 is disposed above the cylindrically shaped water tub 11 so that detergent is dissolved in a process of supplying the washing water at a same time that the washing water is supplied to an inside of the cylindrically shaped water tub 11, and includes water supply valves 21 and 22, water supply hoses 23 and a detergent dissolving device 24. A discharge unit 30 is disposed under the cylindrically shaped water tub 11 to forcibly discharge the washing water that remains inside the cylindrically shaped water tub 11, and includes a discharge hose 31 and a discharge pump 32.

Further, the washing machine is equipped with a drying device 40 to dry the laundry. The drying device 40 includes a centrifugal fan 41 that is mounted on the cylindrically shaped water tub 11, a discharging duct 42 that connects an outlet 41b of the centrifugal fan 41 with an air inlet 17 formed in an upper portion of the opening 14 of the cylindrically shaped water tub 11, and a condensing duct 43 that is mounted on a back of the cylindrically shaped water tub 11 to connect an air outlet 18 formed in a lower portion of the back of the cylindrically shaped water tub 11 with an inlet 41a of the centrifugal fan 41. Further, the drying device 40 includes a drying heater 44 that is disposed in the discharging duct 42 so that hot air is supplied to the inside of the cylindrically shaped water tub 11, and a condensing unit that is disposed in the condensing duct 43 so that moisture is condensed and removed while vapor generated in a drying process moves upward through the condensing duct 43. With this construction, the laundry in the cylindrically shaped water tub 11 is heated and dried by heating air blown by the centrifugal fan 41 and supplying the heated air to the inside of the cylindrically shaped water tub 11, and moisture in the heated and dried air is removed while the vapor generated in a drying process is drawn to the centrifugal fan 41 through the condensing duct 43.

Figure 3:
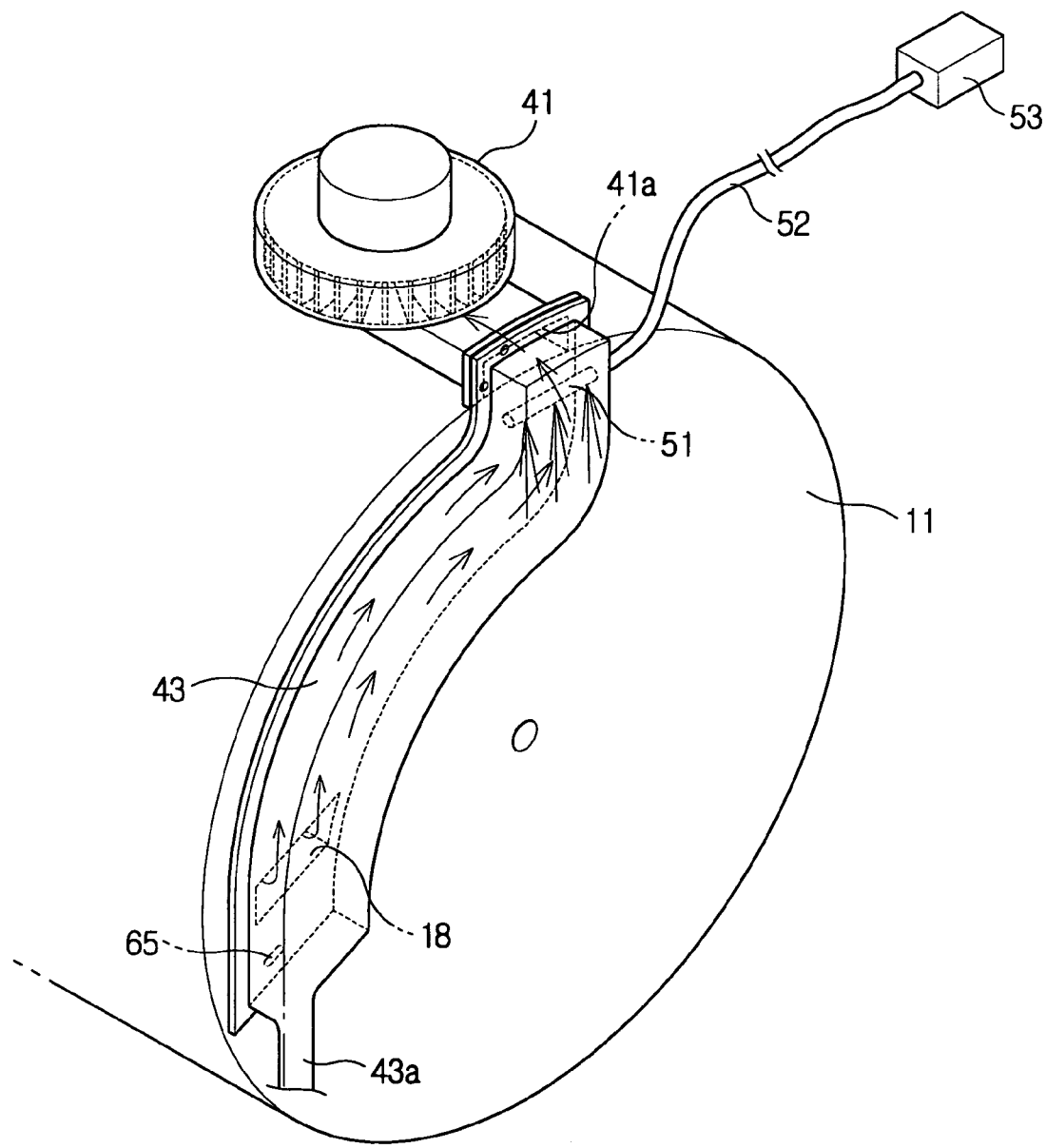
FIGS. 3 to 5 are views showing principal parts of the washing machine of FIG. 1.
Figure 4:
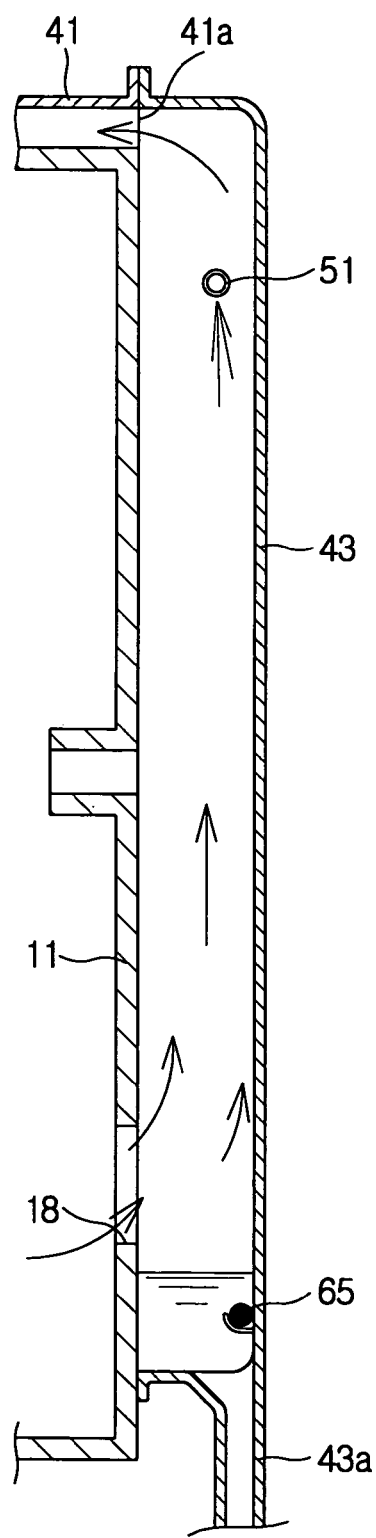
Figure 5:
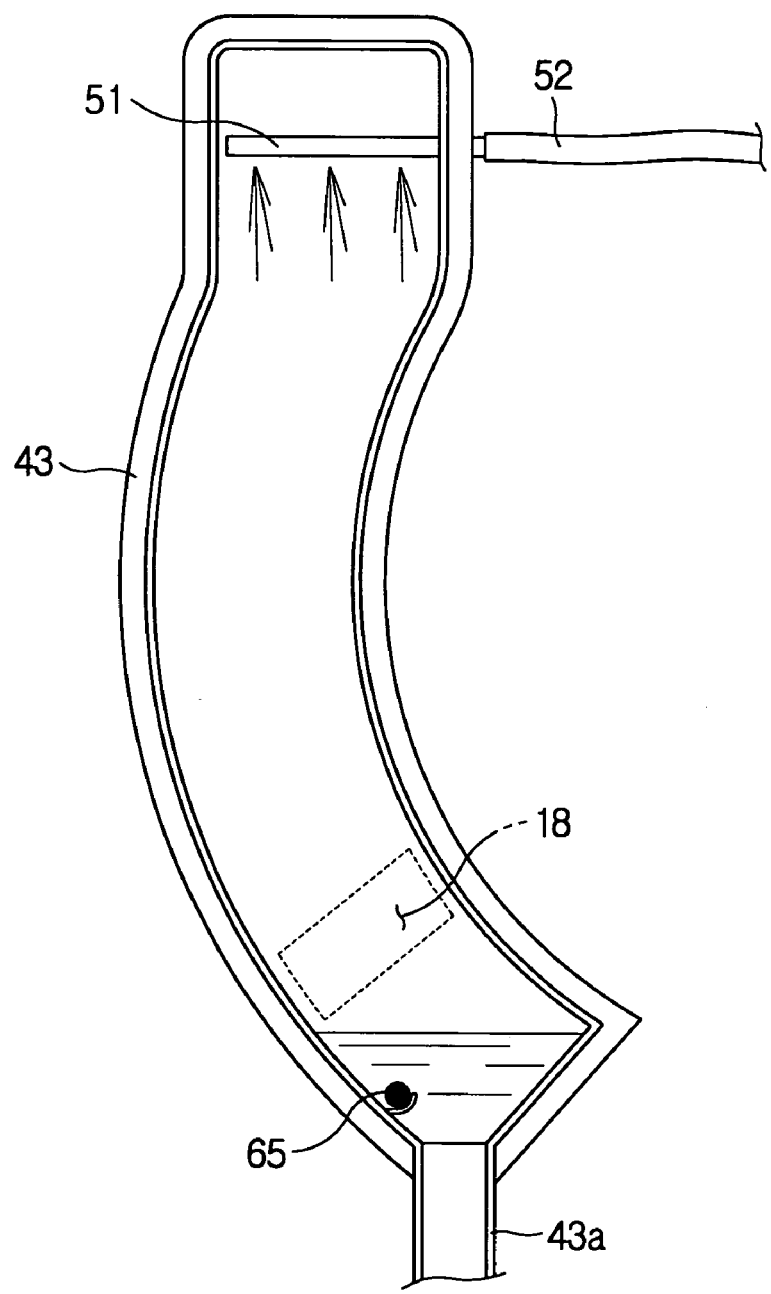

Further, as shown in FIGS. 3 to 5, the condensing duct 43 forms a flow passage that connects the air outlet 18 formed in the lower portion of the back of the cylindrically shaped water tub 11 with the inlet 41a of the centrifugal fan 41 that is mounted on the cylindrically shaped water tub 11. The condensing duct 43 is curved to have a certain curvature in which one open surface thereof is brought into close contact with a back surface of the cylindrically shaped water tub 11 and the inlet 41a of the centrifugal fan 41.

The condensing unit disposed in the condensing duct 43 includes a spray nozzle 51 that is disposed in an inside of the condensing duct 43 and sprays cold water, a cold water supply hose 52 that supplies the cold water to the spray nozzle 51, and a drying valve 53 that is disposed inside the cold water supply hose 52 and is selectively opened or closed to supply the cold water.

A discharging conduit 43a is formed to discharge condensed water formed on a bottom of the condensing duct 43, and one end of the discharging conduit 43a is connected to the discharge hose 31. A water temperature detecting unit 65 is disposed between the discharging conduit 43a and the air outlet 18. The water temperature detecting unit 65 is implemented as a temperature sensor to detect a water temperature. The drying valve 53 operates so that an amount of water collected on the bottom of the condensing duct 43 is greater than an amount of water discharged through the discharging conduit 43a by a certain amount, so that the water temperature detecting unit 65 detects a water temperature while the water temperature detecting unit 65 is submerged in the collected water, and feeds the water temperature to a controller 61, which is described later. The controller determines whether an end of the drying process is reached based upon temperatures of the condensed water.

Figure 6:
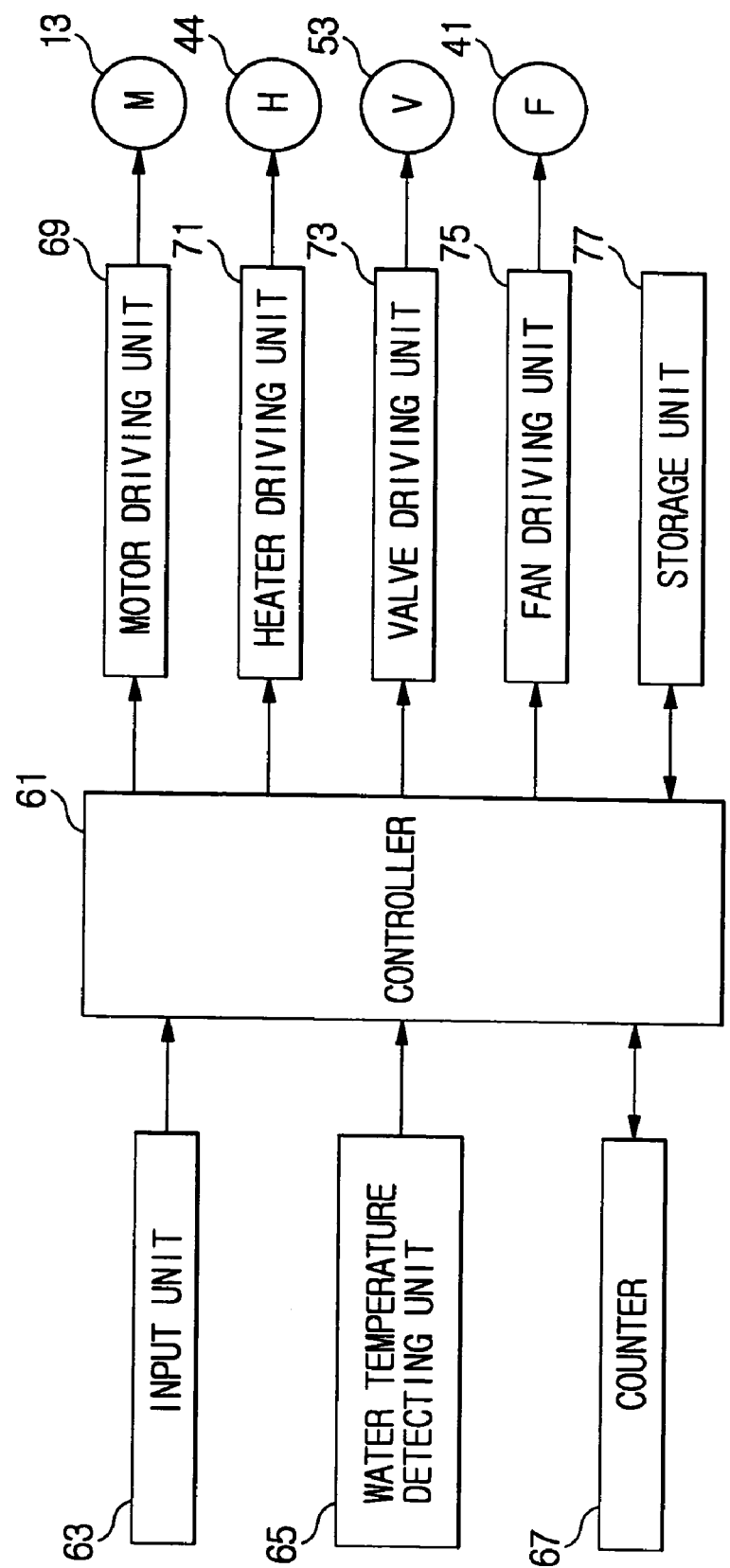
FIG. 6 is a control block diagram of the washing machine of FIG. 1.

Referring to FIG. 6, the washing machine includes the controller 61 that controls an entire process including the drying process. The controller 61 is connected at input terminals thereof to an input unit 63 that inputs setting commands of a user, and to the water temperature detecting unit 65 that detects the temperature of the condensed water. The controller 61 is connected at output terminals thereof to a motor driving unit 69 that drives a driving motor 13, a heater driving unit 71 that drives the drying heater 44, a valve driving unit 73 that drives the drying valve 53, and a fan driving unit 75 that drives the centrifugal fan 41. Further, the controller 61 is connected to a counter 67 and a storage unit 77, so that the controller 61 receives time counted by the counter 67, and stores data in the storage unit 77 or reads data from the storage unit 77.

As is described above, a drying time is influenced by various factors, such as a weight of the laundry, moisture contained in the laundry, and a temperature of the supplied cold water.

Temperatures of water condensed in the drying process, which are temperatures detected by the water temperature detecting unit 65, may be influenced by various factors.

Figure 7A:
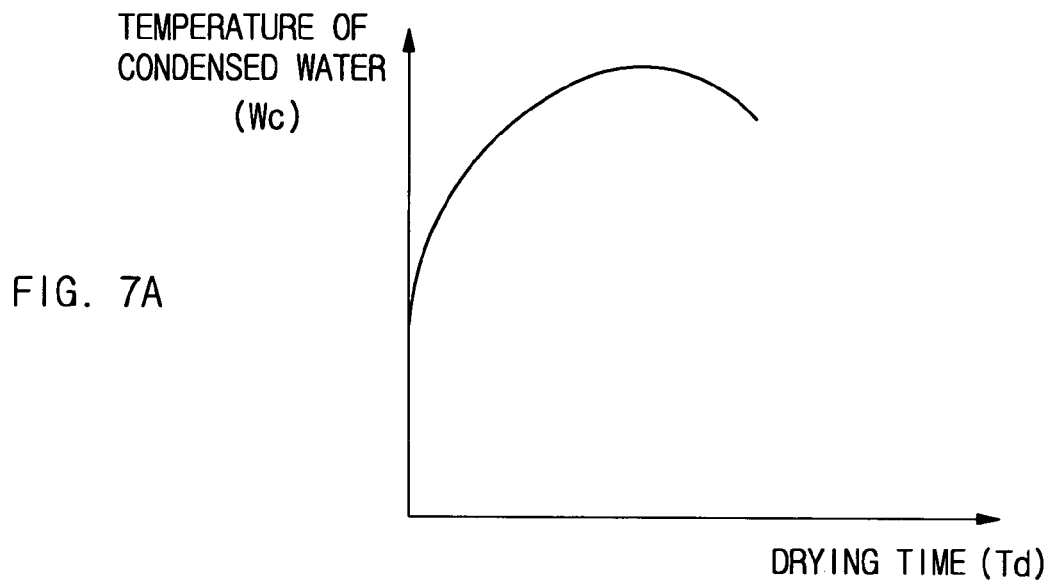
FIGS. 7A to 7E are views illustrating drying processes according to temperatures of condensed water.
Figure 7B:
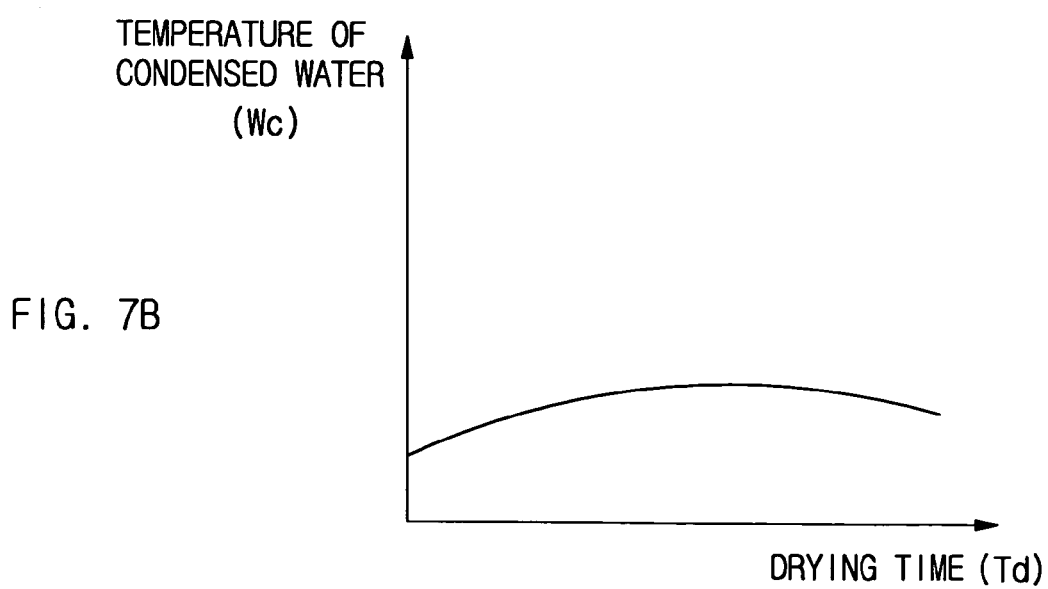

FIG. 7A is a view showing variations of temperatures detected by the water temperature detecting unit 65 until the drying process is terminated, in a case in which a temperature of cold water supplied through the cold water supply hose 52 is a relatively high temperature. FIG. 7B is a view showing the variations of the temperatures detected by the water temperature detecting unit 65 until the drying process is terminated, in a case in which the temperature of the cold water supplied through the cold water supply hose 52 is a relatively low temperature.

As shown in FIGS. 7A and 7B, it can be appreciated that the temperatures detected by the water temperature detecting unit 65 are not fixed to a specific temperature in a point of view of a determination of the drying time.

Figure 7C:
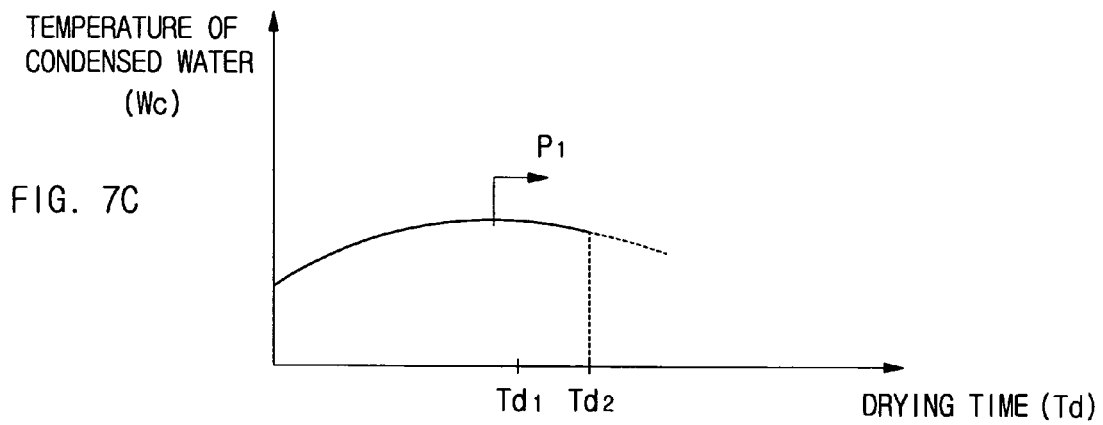
Figure 7D:
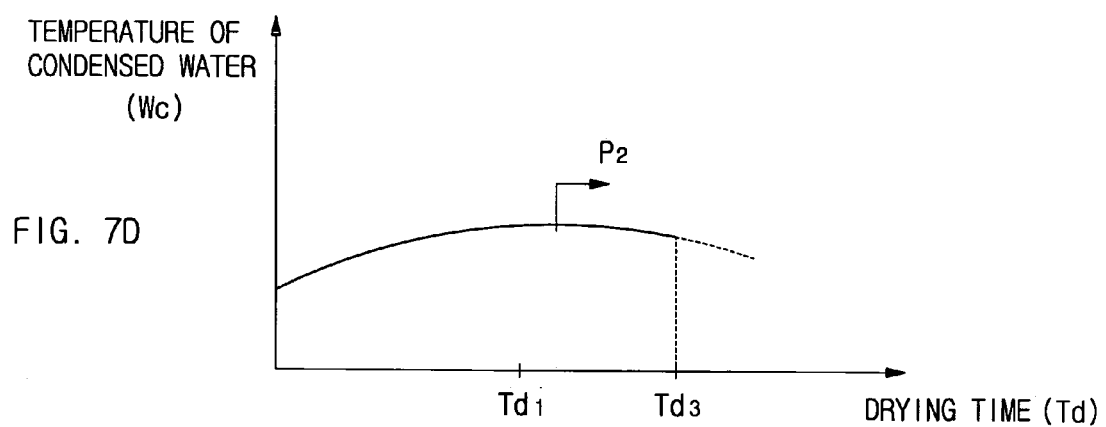
Figure 7E:
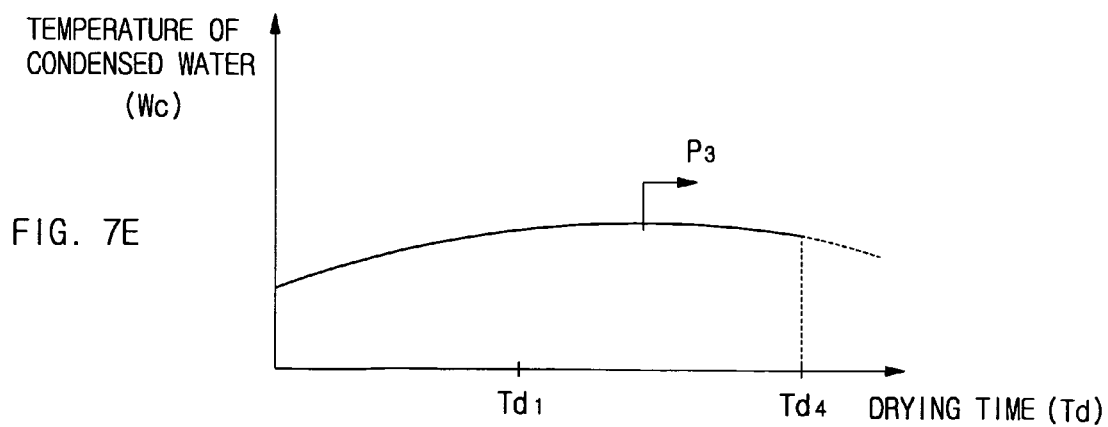

FIG. 7C, is a view showing the variations of the temperatures detected by the water temperature detecting unit 65 until the drying process is terminated, in a case in which a weight of laundry is a relatively light weight. FIG. 7D is a view showing the variations of temperatures detected by the water temperature detecting unit 65 until the drying process is terminated, in a case in which the weight of the laundry is an average weight. FIG. 7E is a view showing the variations of the temperatures detected by the water temperature detecting unit 65 until the drying process is terminated, in a case in which the weight of the laundry is a relatively heavy weight.

In FIG. 7C, the temperature detected by the water temperature detecting unit 65 starts to decrease from a first reference point P1, and then the drying process is terminated when a first drying time Td2 required for the temperature to decrease by a certain value is reached. If the drying process is terminated before the first drying time Td2, the drying performance of the washing machine is lowered, and if the drying process is terminated after the first drying time Td2, the laundry is excessively dried.

In FIGS. 7D and 7E, the temperatures detected by the water temperature detecting unit 65 start to decrease from second and third reference points P2 and P3, respectively, and then the drying processes are terminated when second and third drying times Td3 and Td4 required for the temperatures to decrease by certain values are reached, respectively. If the drying processes are terminated before the second and third drying times Td3 and Td4, respectively, the drying performances of the washing machine is lowered, and if the drying processes are terminated after the second and third drying times Td3 and Td4, respectively, the laundry is excessively dried.

As shown in FIGS. 7A to 7E, the temperatures detected by the water temperature detecting unit 65 are different according to the drying times, but patterns of the variations of the detected temperatures are similar to each other. That is, the detected temperatures increase in initial stages of the drying processes, respectively, and decrease from the first, second and third reference points P1, P2 and P3, respectively, and then the first, second and third drying times, respectively, are reached when a variation rate of the detected temperatures reaches a certain value.

Figure 8A:
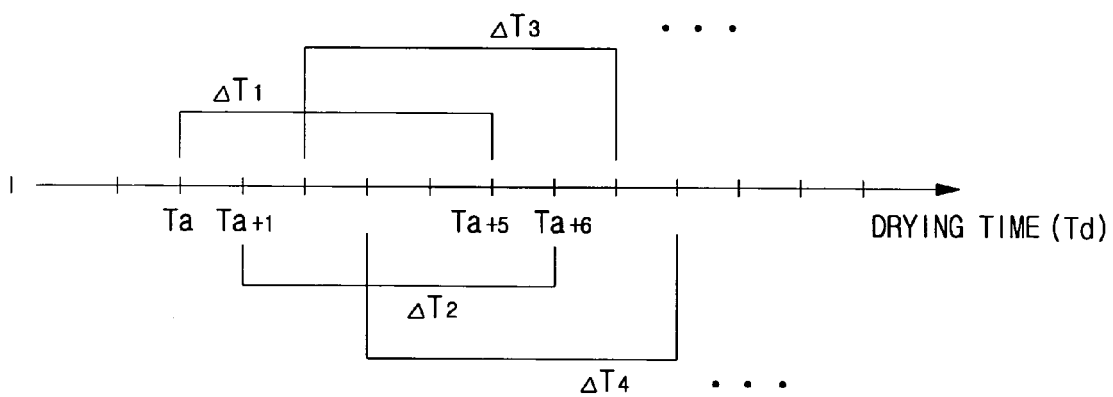
FIG. 8A is a view illustrating an operation of calculating an accumulated temperature difference, according to a second embodiment of the present invention.

The controller 61 accumulates the water temperatures detected by the water temperature detecting unit 65, and determines whether an end of the drying process is reached based upon the variations of the water temperatures. That is, as shown in FIG. 8A, the controller 61 is fed with the detected temperatures from the water temperature detecting unit 65 at regular drying time intervals, for example, at time points Ta, Ta+1, Ta+2, . . . . The controller 61 calculates a difference between two temperatures for each of set sections. That is, a difference $\Delta T$ between initial and final temperatures is obtained in each of the set sections, for example, a first set section being Ta~Ta+5, a second set section being Ta+1~Ta+6, a third set section being Ta+2~Ta+7, . . . . Accordingly, a difference $\Delta T1$ between temperatures in the first set section is a difference between an initial temperature Ta and a final temperature Ta +5 and a difference $\Delta T2$ between temperatures in the second set section is a difference between an initial temperature Ta+1 and a final temperature Ta+6.

The controller 61 calculates differences between temperatures in the set sections at the regular drying time intervals, and determines whether the calculated difference temperature decreases. The reason for this is to determine whether a decreasing stage of the drying process is starting. The variations of the water temperatures in an increasing stage of the drying process is not useful to determine whether an end of the drying process is reached, but the variations of the water temperatures in the decreasing stage of the drying process is a useful factor to determine whether the end of the drying process is reached.

The controller 61 accumulates the calculated temperature differences, compares an accumulated temperature difference with a set value, and then determines whether the end of the drying process is reached. The set value is determined through many tests in consideration of the weight of the laundry, the moisture contained in the laundry and a temperature of the cold water supplied to the condensing duct 43.

If the end of the drying process is determined to be reached, the controller 61 terminates the drying process by turning off the drying heater 44, and cutting off the cold water by closing the drying valve 53.

Figure 9A:
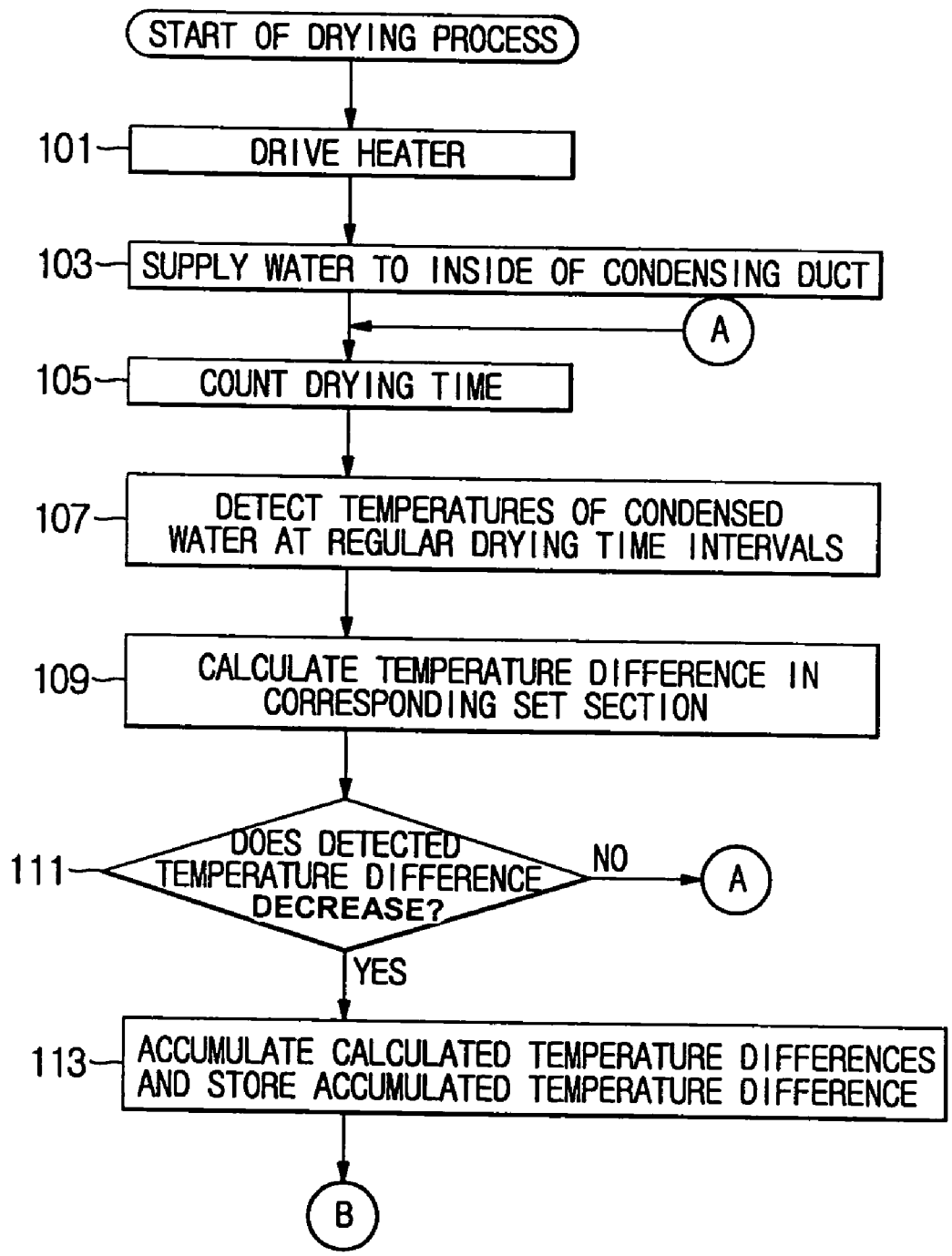
FIGS. 9A and 9B are flowcharts showing a method of controlling a drying process of the washing machine of FIG. 1, according to the first embodiment of the present invention.
Figure 9B:
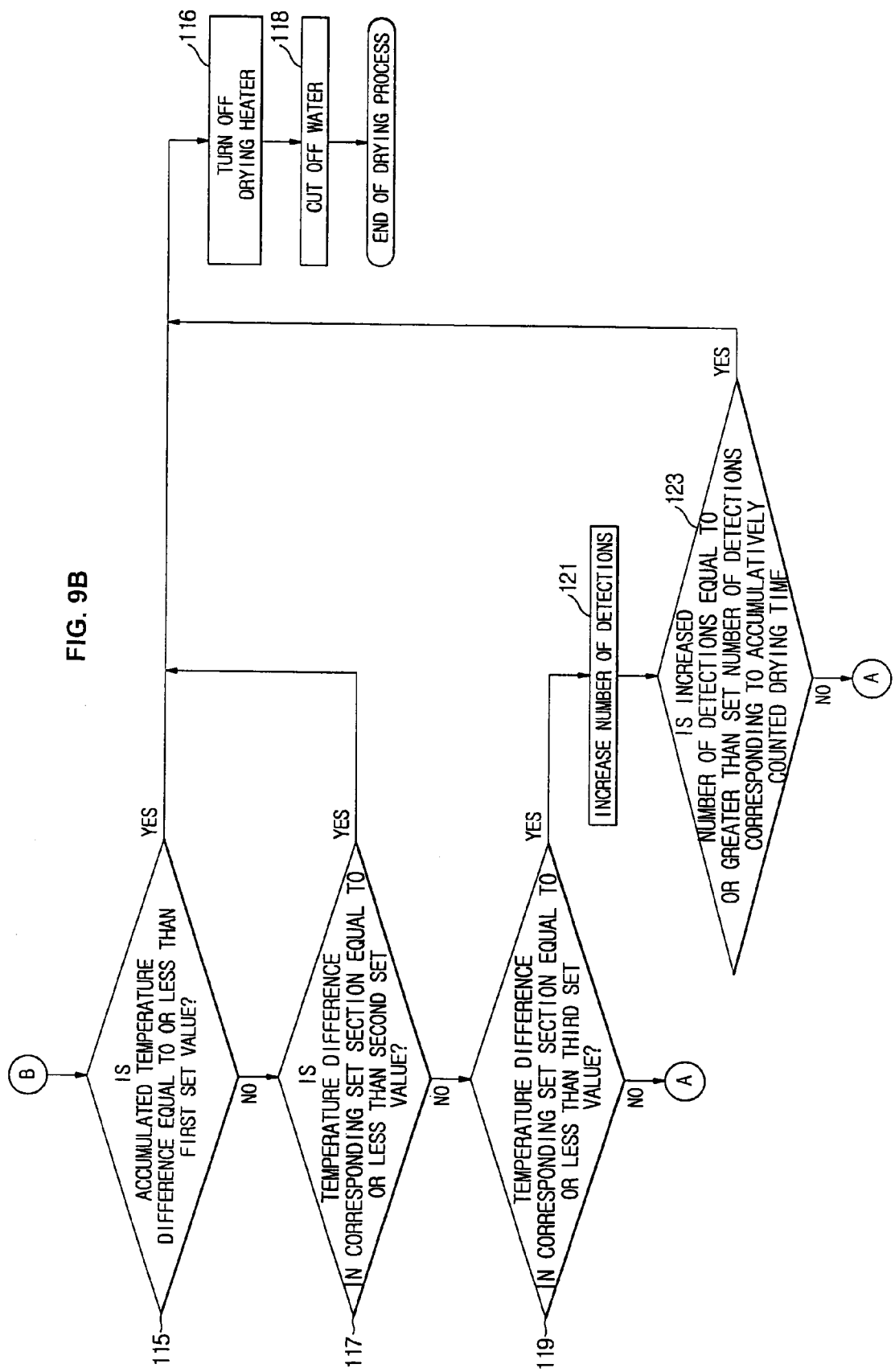

A method of controlling the washing machine with the above-described construction will be described with reference to the attached drawings. A drying process illustrated in FIGS. 9A and 9B may be performed in conjunction with general washing processes, that is, after a washing course including a series of washing, rinsing and spin-drying processes is complete, or may be independently performed to dry laundry.

First, to perform the drying process, the controller 61 controls the motor driving unit 69 to drive the driving motor 13 and then allows the cylindrically shaped rotating tub 12 to slowly rotate so that the laundry falls down in the cylindrically shaped rotating tub 12. At this time, the controller 61 controls the fan driving unit 75 and the heater driving unit 71 to drive the centrifugal fan 41 and the drying heater 44, respectively, in operation 101.

Air blown by the centrifugal fan 41 is heated by the drying heater 44, and then is supplied to the inside of the cylindrically shaped water tub 11, so that the laundry is heated and dried.

The controller 61 controls the valve driving unit 73 to open the drying valve 53, so that the cold water supplied from an external water source passes through the cold water supply hose 52 and then is sprayed to an inside of the condensing duct 43 by the spray nozzle 51 in operation 103. At this time, the controller 61 controls the counter 67 to count the drying time in operation 105.

While vapor generated by the drying of the laundry passes through the air outlet 18 and then is drawn to the centrifugal fan 41, the moisture in the air condenses, and condensed water falls down in the condensing duct 43 and collects on a bottom of the condensing duct 43. In this case, the water temperature detecting unit 65 detects temperatures of the condensed water at the regular drying time intervals and provides information of the detected water temperatures to the controller 61 in operation 107.

The controller 61 is fed with the information of the detected water temperature at each of the regular drying time intervals, calculates a difference between initial and final temperatures in each of the corresponding set sections in operation 109, and determines whether the detected temperatures difference decreases in operation 111. If the detected temperature differences does not decrease as a result of a determination of the operation 111, that is, if the temperatures detected by the water temperature detecting unit 65 increase, as in the initial stage of the drying process, the process returns to the operation 105 to continuously perform the drying process. If the detected temperature difference decreases as a result of the determination of operation 111, the controller 61 accumulates the calculated temperature differences and stores an accumulated temperature difference in the storage unit 77 in operation 113.

The controller 61 determines whether the accumulated temperature difference $\Sigma\Delta T$ is equal to or less than a first set value in operation 115. If the accumulated temperature difference $\Sigma\Delta T$ is not equal to or not less than the first set value as a result of a determination of the operation 115, the controller 61 determines whether the temperature difference in a corresponding set section is equal to or less than a second set value in operation 117.

If the temperature difference in the corresponding set section is not equal to or not less than the second set value (the second set value being less than the first set value) as a result of a determination of the operation 117, the controller 61 determines whether the temperature difference in the corresponding set section is equal to or less than a third set value (the third set value being less than the second set value) in operation 119.

If the temperature difference in the corresponding set section is not equal to or not less than the third set value as a result of a determination of the operation 119, a process returns to the operation 105 to continuously perform the drying process.

If the temperature difference in the corresponding set section is equal to or less than the second set value as a result of the determination of the operation 117, for example, if the temperature difference in the corresponding set section is a relatively great value and, therefore, satisfies a termination condition of the drying process, as in a case in which the weight of the laundry is the relatively small weight as shown in FIG. 7C, the drying heater 44 is turned off in operation 116, and the cold water supplied through the cold water supply hose 52 is cut off by closing the drying valve 53 in operation 118, thus terminating the drying process.

If the temperature difference in the corresponding set section is equal to or less than the third set value as a result of the determination of the operation 119, a number of detections is increased in operation 121. Thereafter, whether the increased number of detections is equal to or greater than a set number of detections corresponding to the drying time accumulatively counted from the operation 105 is determined in operation 123 (see FIG. 8B). If the increased number of detections is equal to or greater than the set number of detections as a result of a determination of the operation 123, for example, if the temperature difference in the corresponding set section satisfies the termination condition of the drying process, as in a case in which the weight of the laundry is the average weight as shown in FIG. 7D, the drying heater 44 is turned off in the operation 116, and the cold water supplied through the cold water supply hose 52 is cut off by closing the drying valve 53 in the operation 118, thus terminating the drying process.

If the increased number of detections is not equal to or not greater than the set number of detections as a result of the determination of operation 123, the temperature difference in the corresponding set section is determined not to satisfy the termination condition of the drying process, so that the process returns to the operation 105.

Further, if the accumulated temperature difference $\Sigma\Delta T$ is equal to or less than the first set value as a result of the determination of the operation 115, for example, if the termination condition of the drying process is satisfied, as in a case in which the drying time is the relatively lengthy time and the variations of the water temperatures are relatively slow as shown in FIG. 7E, the drying heater 44 is turned off in the operation 116, and the cold water supplied through the cold water supply hose 52 is cut off by closing the drying valve 53 in the operation 118, thus terminating the drying process.

As is described above, the washing machine detects the temperatures of the condensed water, and determines whether the end of the drying process is reached based upon the detected temperatures. Accordingly, if the drying process of the laundry is completed, the drying process may be terminated without delay, irrespective of various factors, such as the weight of the laundry, the moisture contained in the laundry, and the temperature of cold water supplied to the inside of the condensing duct, so that the drying performance may be improved. Further, the washing machine allows the drying process to be accurately terminated, thus preventing excessive drying and damage to the laundry, and saving energy.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A washing machine to dry laundry contained in a rotating tub by circulating air heated by a drying heater, comprising:
    a condensing duct to guide the circulated air having passed through the rotating tub to be drawn to the drying heater;
    a cold water supply unit to supply cold water to an inside of the condensing duct;
    a water temperature detecting unit to detect temperatures of water, condensed in the condensing duct through contact between the circulated air and the cold water, using regular time intervals to provide initial detected temperatures and final detected temperatures for set sections; and
    a controller to calculate a temperature difference between the initial detected temperature and the final detected temperature for each set section, and to determine whether an end of a drying process is reached based on a comparison of at least two temperature differences of two set sections.

2. The washing machine as set forth in claim 1, wherein the water temperature detecting unit is positioned in a lower portion of the condensing duct so that the water temperature detecting unit is submerged in the condensed water.

3. The washing machine as set forth in claim 2, further comprising:
    an air outlet disposed in the lower portion of the condensing duct to pass the circulated air therethrough, wherein the water temperature detecting unit is disposed between the air outlet and a bottom of the condensing duct.

4. The washing machine as set forth in claim 1, wherein the cold water supply unit comprises:
    a spray nozzle disposed in the condensing duct;
    a cold water supply hose connected to the spray nozzle; and
    a drying valve disposed in the cold water supply hose to selectively supply or cut off the cold water supplied from an external water source.

5. The washing machine as set forth in claim 1, further comprising:
    a counter to accumulatively count a drying time while the drying process is performed, wherein the controller is provided with the accumulatively counted time from the counter to determine whether the end of the drying process is reached.

6. A washing machine to dry laundry contained in a rotating tub by circulating air heated by a drying heater, comprising:
    a water temperature detecting unit to detect temperatures of water condensed through contact between the circulated air and cold water supplied from an external water source to dry the laundry;
    a counter to accumulatively count a drying time while a drying process is performed; and
    a controller to determine whether an end of the drying process is reached based on the temperatures of the water detected by the water temperature detecting unit and the drying time accumulatively counted by the counter, and to terminate the drying process according to a result of the determination,
    wherein the controller determines whether the end of the drying process is reached by detecting the water temperatures at regular drying time intervals using the water temperature detecting unit, and comparing an accumulated temperature difference, which is calculated by accumulating temperature differences obtained in set sections, with a set value.

7. The washing machine as set forth in claim 6, wherein the controller determines whether the end of the drying process is reached when the temperature of the water detected by the water temperature detecting unit decreases.

8. The washing machine as set forth in claim 7, wherein the controller further determines whether the end of the drying process is reached by increasing a number of detections if the accumulated temperature difference satisfy the set value, and by comparing the increased number of detections with a set number of detections corresponding to the accumulatively counted drying time.

9. A washing machine to dry laundry contained in a rotating tub by circulating air therethrough, comprising:
    a heater;
    a condensing duct to guide the circulated air from the rotating tub to the heater;
    a water supplier to supply water to the condensing duct such that water is condensed from the circulated air in the condensing duct by communication between the circulated air and the supplied water;
    a temperature detector to detect temperatures of the condensed water, using regular time intervals to provide initial detected temperatures and final detected temperatures for set sections; and
    a controller to calculate a temperature difference between the initial detected temperature and the final detected temperature for each set section, and to terminate a drying process according to a comparison of at least two temperature differences of two set sections.

10. A washing machine including a rotating tub to dry laundry, comprising:
    a condensing duct to condense water from circulated air;
    a temperature detector to detect temperatures of the condensed water using regular time intervals to provide initial detected temperatures and final detected temperatures for set sections; and
    a controller to terminate a drying process according to a comparison of at least two temperature differences of two set sections.

11. The washing machine as set forth in claim 10, wherein the temperature detector is positioned in a lower portion of the condensing duct so that the temperature detector is submerged in the condensed water.

12. The washing machine as set forth in claim 11, further comprising:
an air outlet disposed in the lower portion of the condensing duct to pass the circulated air therethrough, wherein the temperature detector is disposed between the air outlet and a bottom of the condensing duct.

13. The washing machine as set forth in claim 10, further comprising:
a water supplier to supply water to the condensing duct such that the condensed water is condensed in the condensing duct by communication between the circulated air and the supplied water, and comprises:
a spray nozzle disposed in the condensing duct;
a water supply hose connected to the spray nozzle; and
a drying valve disposed in the water supply hose to selectively supply the water supplied from an external water source.

14. The washing machine as set forth in claim 10, further comprising:
a counter to accumulatively count a drying time while the drying process is performed such that the controller is provided with the accumulatively counted drying time from the counter to determine whether an end of the drying process is reached to terminate the drying process.

15. A washing machine to dry laundry contained in a rotating tub by circulating air therethrough, comprising:
a temperature detector to detect a temperature of water condensed by communication between the circulated air and water supplied from an external water source;
a counter to accumulatively count a drying time while a drying process is performed; and
a controller to terminate the drying process according to changes in the temperature of the condensed water and the accumulatively counted drying time,
wherein the controller determines whether to terminate the drying process by detecting the temperature of the condensed water at regular time intervals using the temperature detector, and comparing accumulated temperature differences, which are accumulated over corresponding ones of the regular time intervals, with a set value.

16. The washing machine as set forth in claim 15, wherein the controller determines whether to terminate the drying process based on the temperature of the condensed water detected by the temperature detector decreasing.

17. The washing machine as set forth in claim 15, wherein the controller further determines whether to terminate the drying process by increasing a number of detections of the temperature of the condensed water if the accumulated temperature difference satisfy the set value, and by comparing the increased number of detections with a set number of detections corresponding to the accumulatively counted drying time.

18. The washing machine as set forth in claim 10, further comprising:
a rotating tub;
a water tub, surrounding the rotating tub, and having an opening with an air inlet formed therein and an air outlet formed in another surface of the water tub; and
a drying device to dry the laundry, which comprises:
a centrifugal fan mounted on the water tub and having an inlet and an outlet, and
a discharging duct connecting the outlet of the centrifugal fan with the air inlet of the water tub, the condensing duct being mounted remote from the opening of the water tub to connect the outlet of the centrifugal fan with an inlet thereof.

19. The washing machine as set forth in claim 18, wherein the drying device further comprises:
a drying heater disposed in the discharging duct so that hot air is supplied to an inside of the water tub; and
a condenser disposed in the condensing duct so that moisture is condensed and removed while vapor generated in the drying process moves through the condensing duct.

20. The washing machine as set forth in claim 18, wherein the drying device further comprises:
a drying heater disposed in the discharging duct so that hot air is supplied to an inside of the water tub; and
a condenser disposed in the condensing duct so that moisture is condensed and removed while vapor generated in the drying process moves through the condensing duct.

21. The washing machine as set forth in claim 18, wherein the condensing duct is curved to have a curvature in which one open surface thereof is adjacent to a back surface of the water tub and the inlet of the centrifugal fan.

22. The washing machine as set forth in claim 18, further comprising:
a discharge hose to discharge the condensed water, wherein the condensing duct includes a discharging conduit formed to discharge the condensed water therefrom, and one end of the discharging conduit is connected to the discharge hose, the temperature detector being disposed between the discharging conduit and the air outlet of the water tub.

23. The washing machine as set forth in claim 13, wherein the drying valve operates so that an amount of water collecting in the condensing duct is greater than an amount of water discharged through the discharging conduit, so that the water temperature detector is submerged in the collected water.

24. The washing machine as set forth in claim 1, wherein each set section includes at least three detected temperatures including the initial detected temperature and the final detected temperature.

* * * * *